United States Patent Office 3,510,640
Patented May 5, 1970

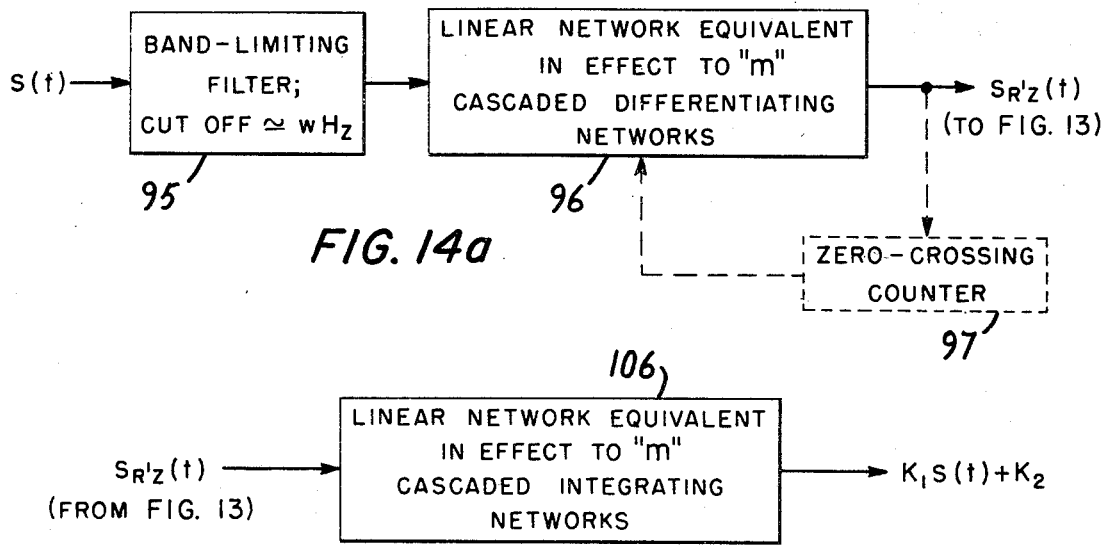
FIG. 14a
FIG. 14b
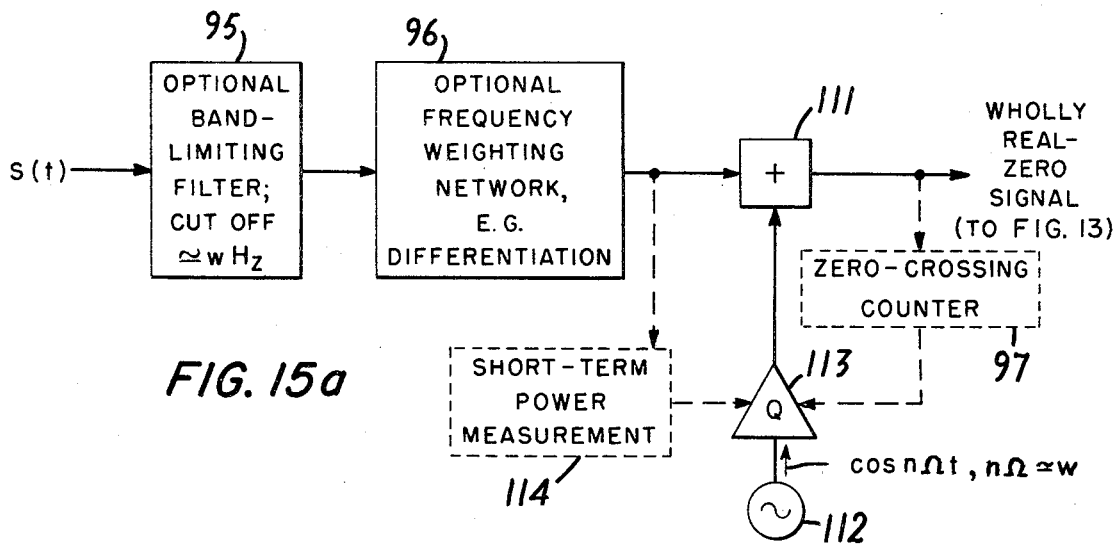
FIG. 15a
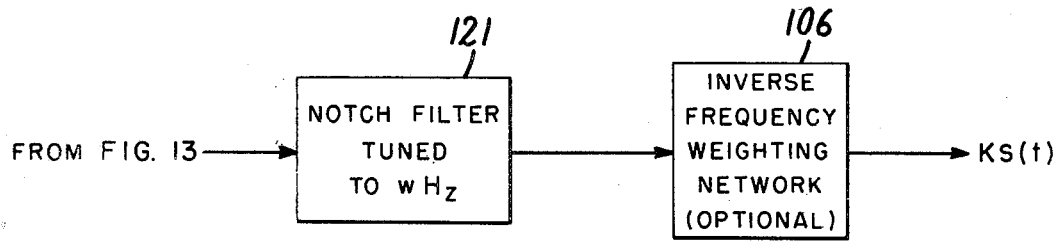
FIG. 15b
INVENTOR.
HERBERT B. VOELCKER, JR.
BY Brumbaugh, Free,
Graves & Donohue
his ATTORNEYS

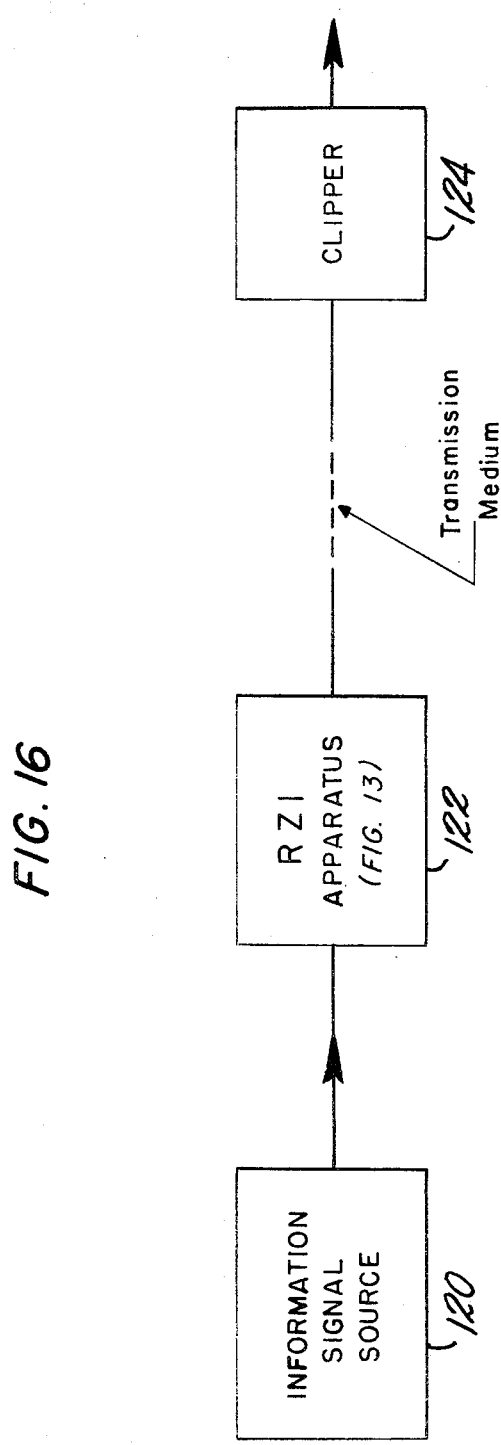

3,510,640
METHOD AND APPARATUS FOR INTERPOLA-
TION AND CONVERSION OF SIGNALS SPECI-
FIED BY REAL AND COMPLEX ZEROS
Herbert B. Voelcker, Jr., Rochester, N.Y., assignor to
Research Corporation, New York, N.Y., a nonprofit
corporation of New York
Filed May 13, 1966, Ser. No. 550,021
Int. Cl. H04b 1/62; H03k 9/00
U.S. Cl. 235—197                                    25 Claims

ABSTRACT OF THE DISCLOSURE

The disclosure relates to techniques and apparatus for modifying intelligence signals for transmission, often at reduced bandwidths, without significant loss of information content. In the case of a pulse signal, wherein the intelligence is embodied in the transitions between two amplitude states, the pulse train signal is converted, by a process of interpolation, to a continuous, reduced bandwidth signal having alternating polarity portions with zero-axis crossings, i.e., real zeros, corresponding in time to the transitions of the pulse signal. At reception, the original pulse train is reconstituted from the continuous waveform. Where the input signal is continuous, such as a speech wave, it may be converted to a pulse form, such as by clipping, and then transformed as above.

If it is desired to transmit a bandwidth limited signal describable as a continuous function having both real and complex roots or zeros, the input signal is first processed to transform the complex roots or zeros into real zeros, along with the original real zeros of the signal. The resultant is then processed as above. Upon reception, a reverse transformation is performed. Since the information in the original signal wave is more completely specified by both the real and complex roots, greater fidelity of transmission is thereby obtained.

The foregoing techniques are explained mathematically and circuitry for carrying them out is described.

---

This invention relates to methods and means for processing a signal so as to obtain one or more advantageous results later described. Broadly considered, the term "signal" as used herein refers to any varying quantity whether it be of electrical or other character and where that quantity carries information or is a potential source of information or, alternatively, is merely noise. The invention will be described, however, in connection with, specifically its application to the processing of random or non-random electric signals.

For a better understanding of the invention, reference is made to the following description of representative embodiments thereof and to the accompanying drawings wherein:

FIGS. 1, 2a, 2b, 2c, 3, 4a, 4b and 4c are waveform diagrams of aid in understanding the character of the invention;

Figure 5:
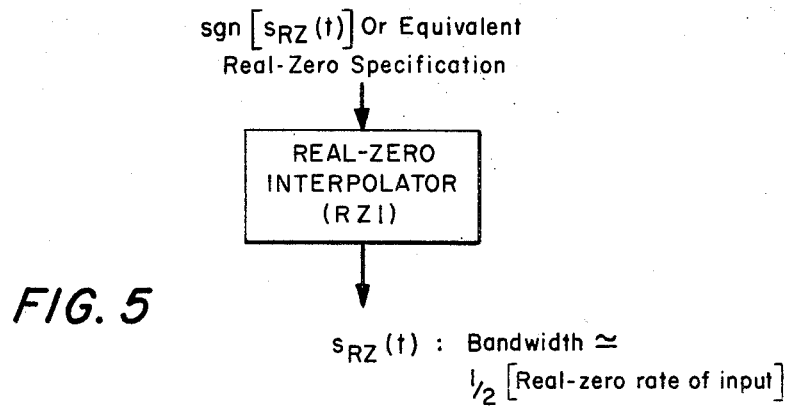
FIG. 5 is a one block diagram of a real zero interpolation system according to the invention.
Figure 7:
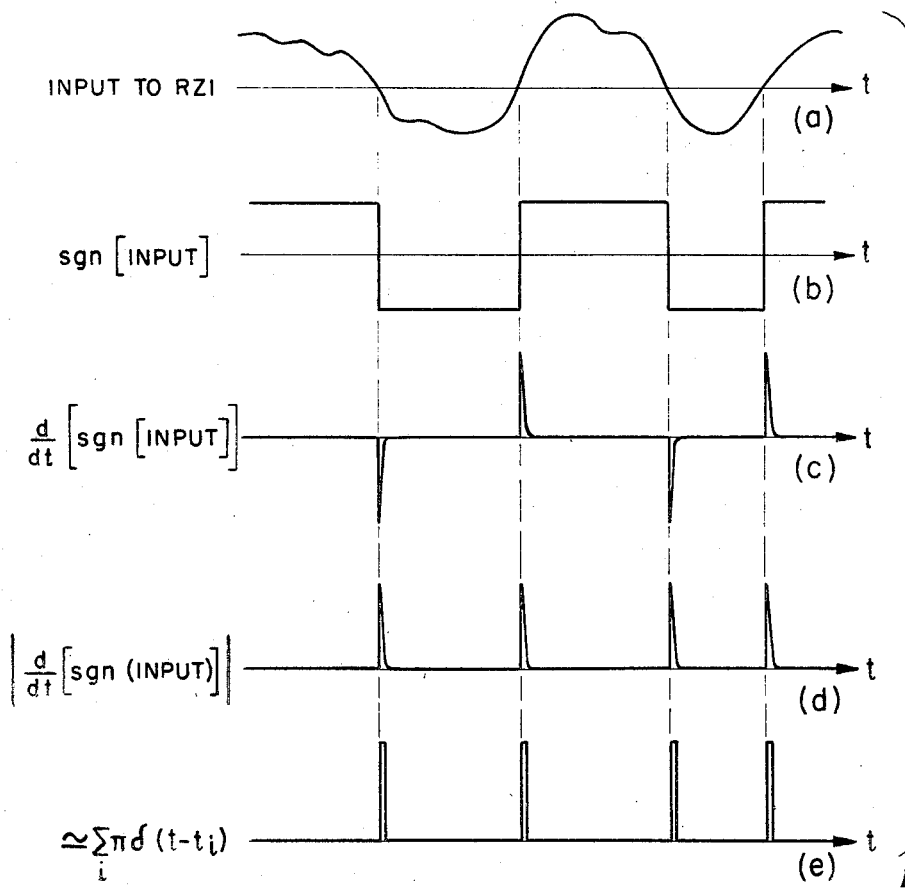
Figure 6:
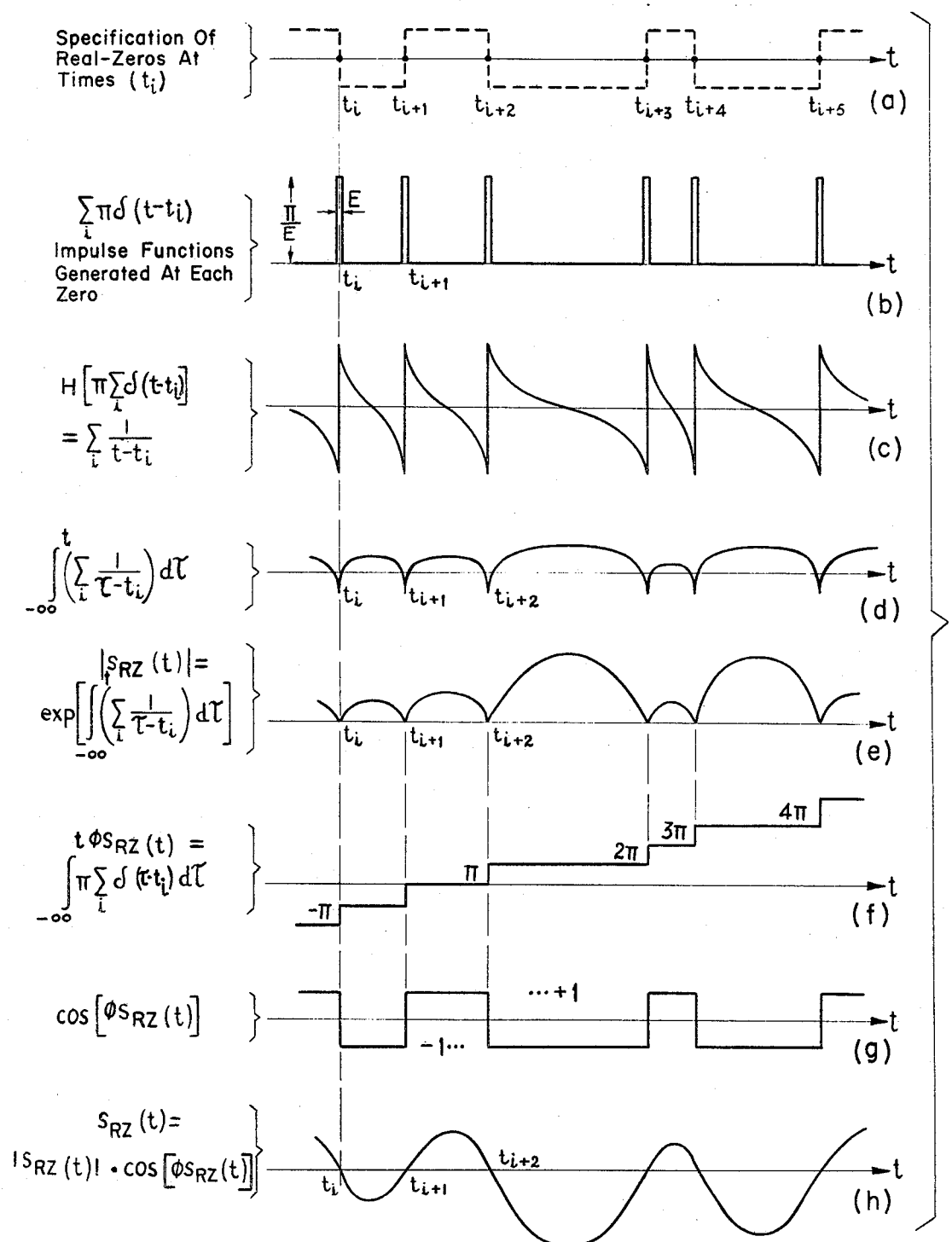
Figure 8:
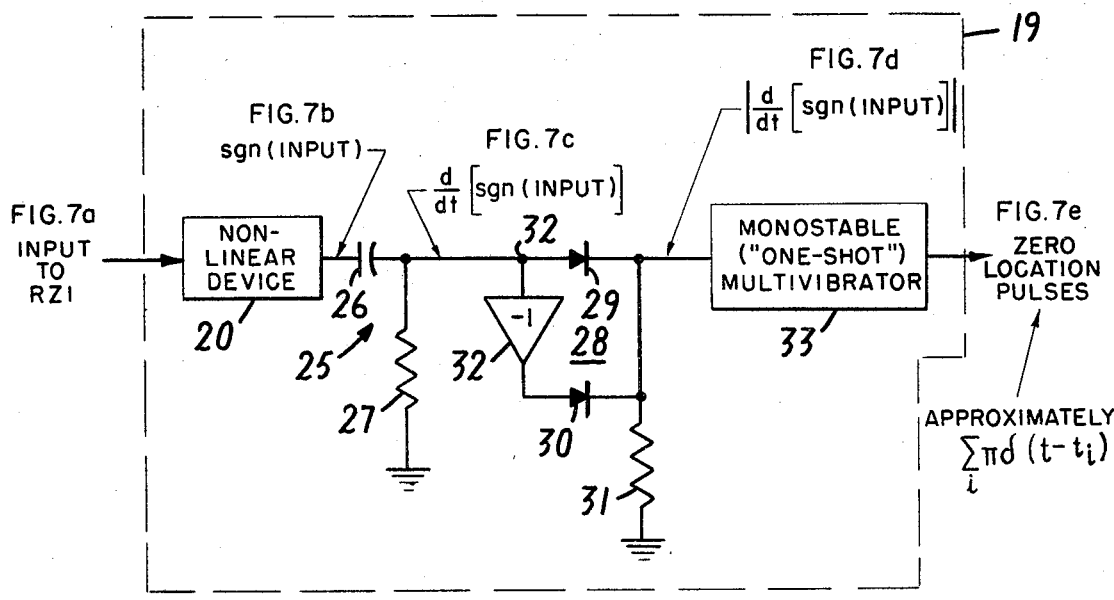
Figure 9A:
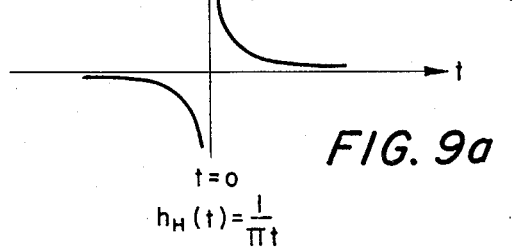
Figure 9B:
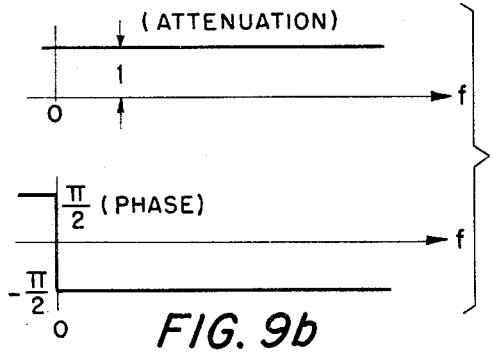
Figure 9C:
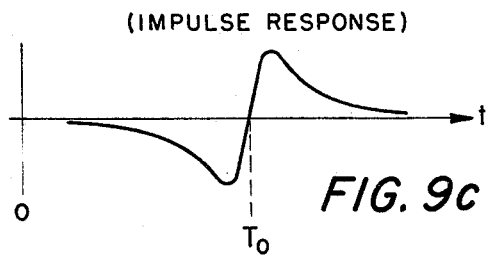
Figure 9D:
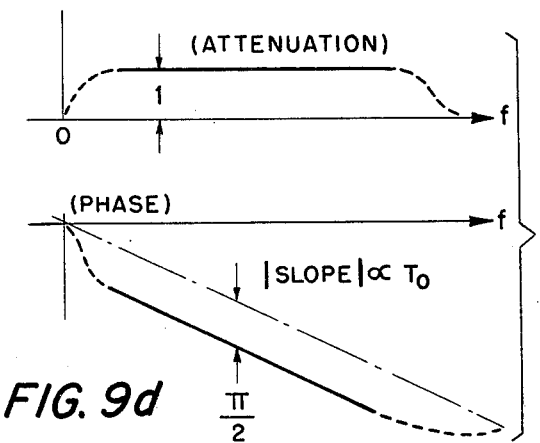
Figures 10, 11:
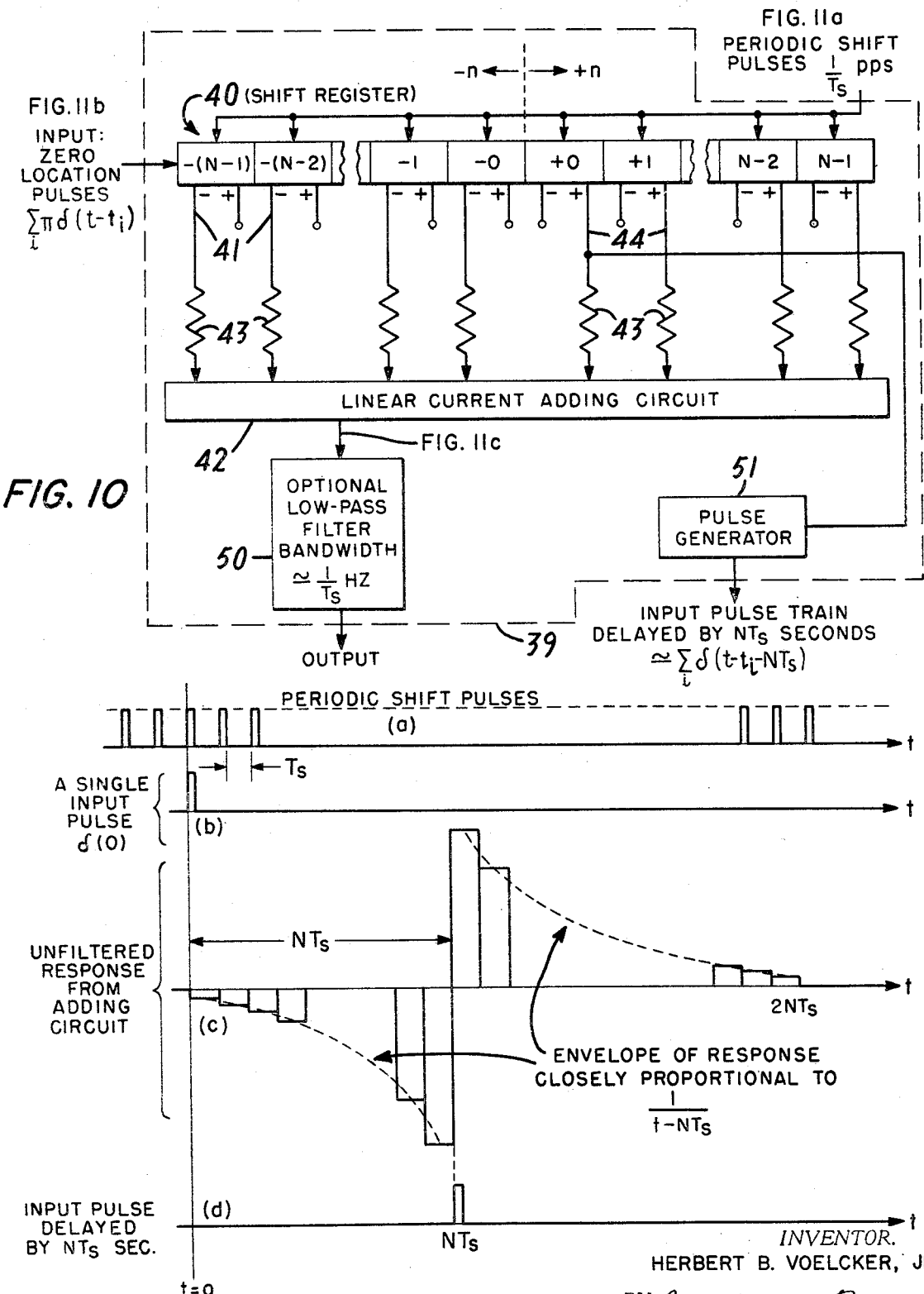
Figure 12:
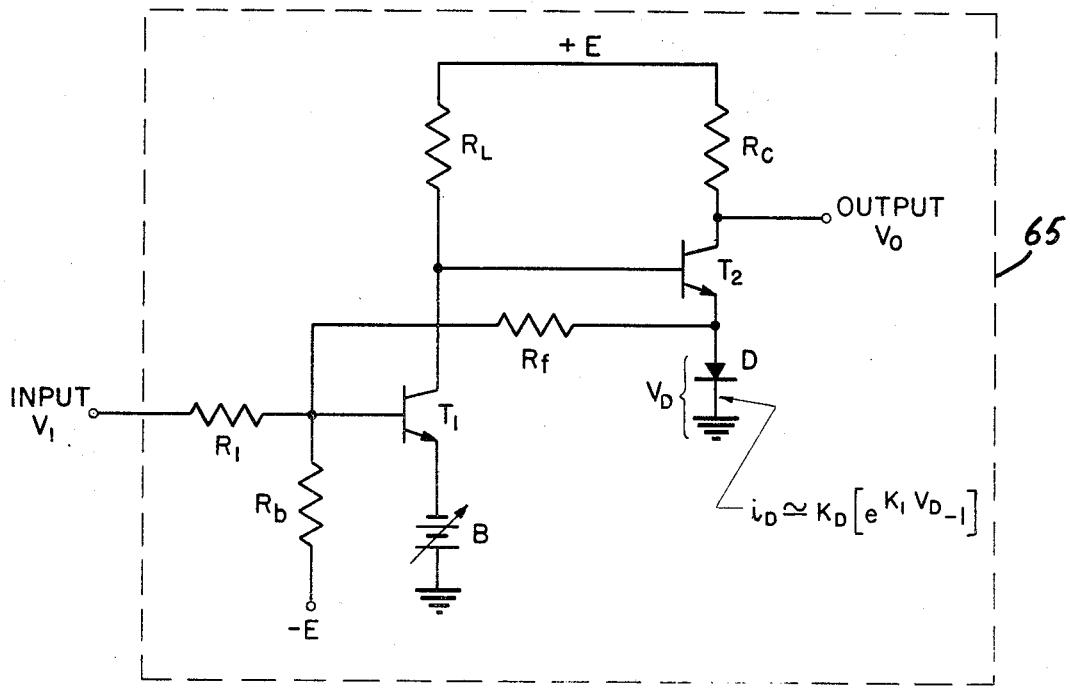
Figure 13:
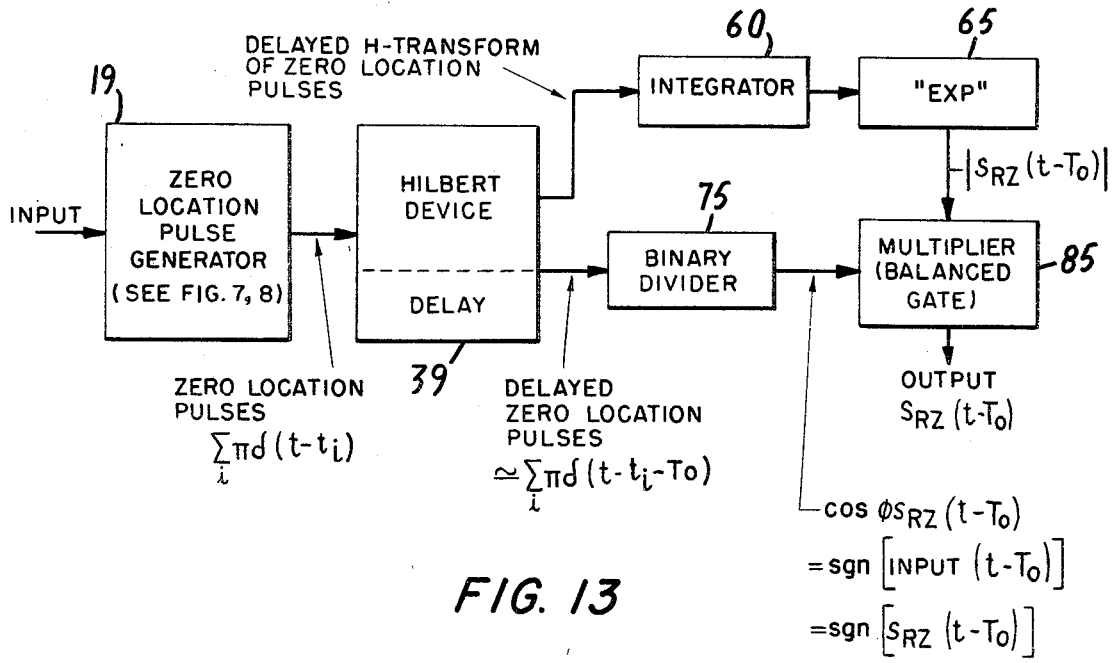

FIG. 6a–6b (collectively designated as FIG. 6) are diagrams of waveforms characterizing the FIG. 5 RZI system as exemplified by an embodiment thereof;

FIGS. 7a–7b (collectively designated as FIG. 7) are diagrams of waveforms characterizing exemplary zero-crossing detecting operations which may be used in conjunction with an RZI system such as is depicted in FIG. 5;

FIG. 8 is a partly schematic and partly block diagram of zero-crossing detector means characterized by the waveforms shown in FIG. 7;

FIGS. 9a–9d (collectively designated as FIG. 9) are diagrams of ideal and practical signal characteristics of an exemplary Hilbert transformation device usable in an RZI system such as is broadly depicted in FIG. 5;

FIG. 10 is an exemplary hybrid (digital-analog) Hilbert transformation device characterized by the practical signal characteristics shown by FIGS. 9c and 9d;

FIGS. 11a–11c (collectively designated as FIG. 11) are waveform diagrams of the FIG. 10 device;

FIG. 12 is a schematic diagram of an exemplary exponentiation circuit usable in an RZI system such as is broadly depicted in FIG. 5;

FIG. 13 is an overall block diagram of an exemplary embodiment of an RZI interpolator system such as is broadly depicted in FIG. 5, the FIG. 13 embodiment incorporating as components the circuits shown in FIGS. 8, 10 and 12;

FIGS. 14a and 14b are block diagrams of auxiliary devices usable in conjunction with the FIG. 13 system to convert complex zero into real zeros and then back again to complex zeros;

FIGS. 15a and 15b are block diagrams of auxiliary devices usable in lieu of those of FIGS. 14a and 14b; and FIG. 16 is a block diagram of an information transmission system according to the invention.

The mathematical basis for the methods and means to be described herein is set forth in my article "Toward a Unified Theory of Modulation, Part I, Phase-Envelope Relations" which appeared in the Proceedings of the IEEE, vol. 54, No. 3, March 1966. That article involves a study of bandlimited waves which exhibit simultaneous phase and envelope fluctuations. It was found that phase and envelope fluctuations are related and that both are describable in terms of the real or complex zeros of the wave, i.e., in terms of the real or complex roots of a polynomial or other mathematical expression representative of the wave. When the wave is periodic, its zeros can be determined from the factorization of its Fourier series representation. The considerations mentioned led to the conclusion expressed in my article that the zeros of a bandlimited signal wave or other wave can be regarded as fundamental information attributes of that wave in the sense that, from the informational point of view, any such wave is fully specified (except for the polarity and magnitude of a scaling factor) by its real and complex zeros, wherefore the wave itself can be treated in terms of the set or pattern formed in a z-plane by the real and complex zeros characterizing the wave.

Figures 1, 2:
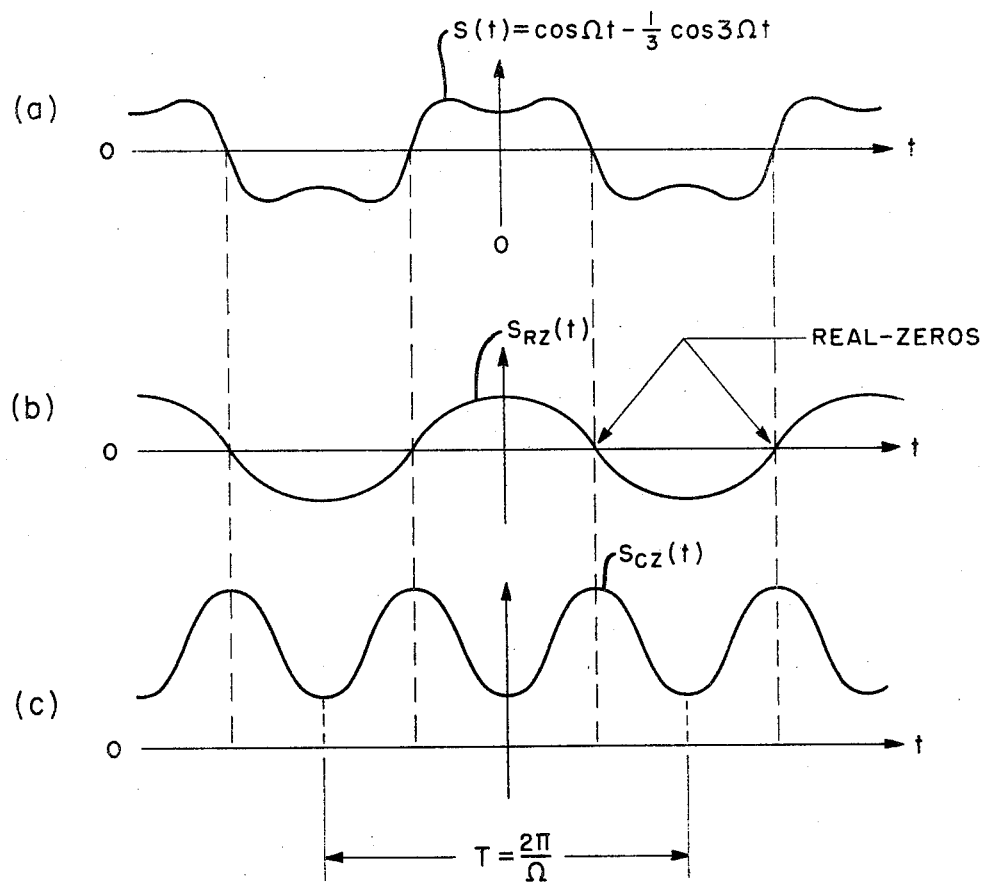

Real and complex zeros are also discussed in an article by Bond and Cahn entitled "on Sampling the Zeros of Bandwidth Limited Signals" and appearing in IRE Transactions of Information Theory, vol. IT-4, pp. 110–113, September 1958. Moreover, U.S. Pats. 3,050,700 and 3,054,073 issued in the name of K. H. Powers propose modulating systems of background interest in connection with the methods and means to be described herein. None of the mentioned prior art references, however, discloses any way for realizing the results obtainable by the present invention Turning now to the figures, FIG. 1 illustrates a continuous bandlimited signal $s(t)$. It is convenient, although not essential, to imagine that such a signal is periodic in T, i.e. that it repeats itself every T seconds. Then the signal can be represented with a Fourier series of the form:

$$s(t) = \sum_{K=0}^{N} C_K \cdot \cos[K\Omega t + \theta_K] \qquad (1)$$

where $\Omega = 2\pi/T$.

This series has a finite number of terms because of the assumption of bandwith limitation; the amplitude coefficients $C_K$ and phase coefficients $\theta_K$ can be found by well known formulae. T and N can be arbitrarily large for our purposes, so (1) is quite a general model.

It can be shown from my mentioned article that $s(t)$ has 2N zeros per period T. These zeros are calculable as the roots of (1) expressed as a polynomial in $e^{j\omega t}$ via Euler's formula, viz.

$$\cos \phi = \frac{1}{2}[e^{j\phi} + e^{-j\phi}] \qquad (2)$$

Some or all of these 2N zeros may be first-order or higher odd order real zeros, in which case they describe the axis crossings ("zero crossings") of $s(t)$. The other zeros in the 2N count are called complex zeros. Loosely speaking they are associated with non-zero minima of $|s(t)|$. In this connection, reference is made to my mentioned article and Part II of said article ("Toward a Unified Theory of Modulation: Part II—Zero Manipulation," Proc. IEEE, vol. 54, pp. 735-755, May 1966) for techniques for finding zeros, significance of zero order, conventions on even order zeros, etc.

The real signal $s(t)$ described by (1) can always be factored into two components as shown in (3).

$$s(t) = s_{RZ}(t) s_{CZ}(t) \qquad (3)$$

where the subscripts RZ, CZ denote wholly real and wholly complex zero content. If there are no real or no complex zeros amongst the 2N zeros of $s(t)$ such that $s(t)$ is characterized by, respectively, only complex zeros or only real zeros then $s_{RZ}(t)$ or $s_{CZ}(t)$, respectively, is taken as unity. Further, it can be shown that both $s_{RZ}(t)$ and $s_{CZ}(t)$ are periodic in T and have a bandwidth equal to or less than that of $s(t)$, and it can also be shown that the bandwidths of $s_{RZ}(t)$ and $s_{CZ}(t)$ must sum to the bandwidth of $s(t)$. Further, $s_{CZ}(t)$ is a wholly positive or wholly negative signal which never changes sign. This is not rue for $s_{RZ}(t)$, however.

As an example, let $s(t)$ be:

$$s(t) = \cos \Omega t - \frac{1}{3} \cos 3\Omega t \qquad (4)$$

which is an approximation to a square wave as shown in FIG. 2a. Its factorization is:

$$s(t) = \frac{2}{3}[\cos \Omega t] \cdot [2 - \cos 2\Omega t] \qquad (5)$$

and, ignoring the factor of ⅔, we have:

$$s_{RZ}(t) = \cos \Omega t \qquad (6)$$

$$s_{CZ}(t) = 2 - \cos 2\Omega t \qquad (7)$$

which are shown in FIGS. 2b, 2c. Note that $s_{CZ}(t)$ is wholly positive and that the highest frequency in $s(t)$ is the sum of the frequencies of the highest components in $s_{RZ}(t)$ and $s_{CZ}(t)$. While $s(t)$ must have 6 zeros per period (twice the highest component number, the only real zeros ("zero crossings") are the two per period of $s_{RZ}(t)$. The four other zeros are in two conjugate pairs per period associated with $s_{CZ}(t)$.

Finally, if one knows the locations and orders of the (real and complex) zeros of a signal, it is possible in principle to specify the signal itself except for an arbitrary positive or negative amplitude scale factor.

Figure 3:
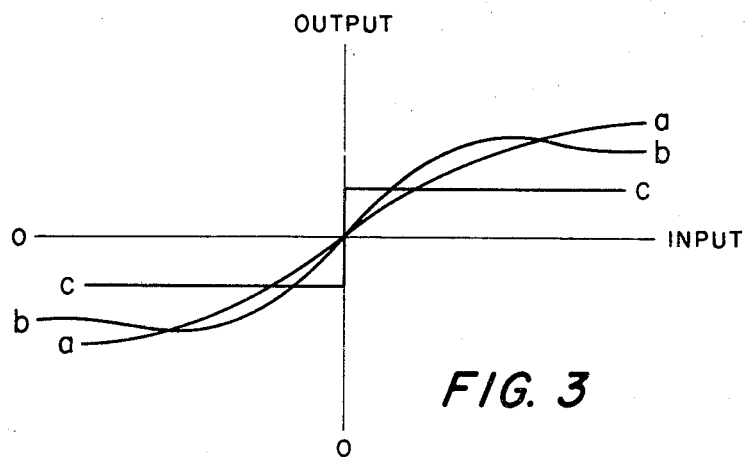

Now consider FIG. 3, which shows various input-output characteristics, *a, b* and *c* for a class of "instantaneous" nonlinear devices or transformations. If a band-limited signal $s(t)$ is applied to such a device, the zero count (per period) of the output will be increased and often will be infinite because the output spectrum, generally is broader than the input (spectrum) (see FIGS. 4a, 4b, and 4c). Note that transformations of the type illustrated in FIG. 3 (i.e., which pass through the origin and are single-valued for zero input and zero output near the origin) are real-zero preserving.

Of special interest, because of is importance in engineering practice, is the *c* transformation of FIG. 3. This is an "ideal limiter" or "infinite clipper" characteristic which converts the input into a binary (two level) signal. Much of the remaining discussion will be cast in terms of this characteristic.

It should be noted, however, that a non-linear device is only convenient to (rather than necessary to) the practice of the present invention, and that the only function performed by such device is to make easier the subsequent accurate detection of the zero-crossings of the signal $s(t)$. Thus, the preliminary transformation of the $s(t)$ signal can be avoided by the use of subsequent equipment which does not require such transformation in order to accurately detect and indicate the occurrences of such zero-crossings.

For convenience we denote a limiter output as sgn [input]. Thus, for FIG. 4c:

$$\operatorname{sgn} s(t) = [s(t)] = \begin{cases} +1, s(t) > 0 \\ -1, s(t) < 0 \end{cases} \qquad (8)$$

where the output magnitude unity, is normalized for convenience.

Next, observe that $$\operatorname{sgn}[s(t)] = \operatorname{sgn}[s_{RZ}(t)] \qquad (9)$$

This is true because $s_{CZ}(t) = s(t)/s_{RZ}(t)$ never changes algebraic sign. Thus, the limiter (and many other types of non-linear devices) destroy or severely perturb the complex-zero component of $s(t)$ while preserving the crucial attributes—the real zero—of $s_{RZ}(t)$.

Observe also (see FIG. 4c) that sgn $[s(t)]$ can often serve as a model for many "intrinsically binary" signals, e.g. sequential binary data, black-and-white television or facsimile.

We will now discuss a procedure called "real-zero interpolation" for recovering $s_{RZ}(t)$ from sgn $$[s_{RZ}(t)] = \operatorname{sgn}$$

Figure 4:
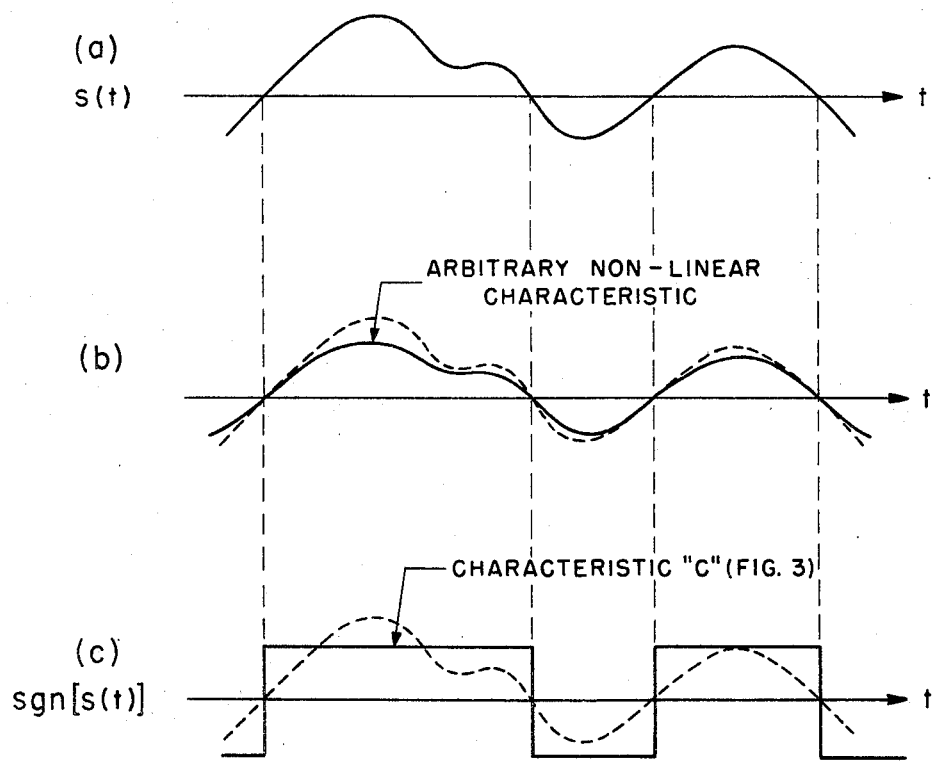

$[s(t)]$, or more generally, from any transformation of $s_{RZ}(t)$ or $s(t)$ which preserves the real zeros. By applying such procedure to the "intrinsically binary" signals considered above, a continuous signal $s_{RZ}(t)$ can be found which has the same zero crossings and is (essentially) bandlimited to the smallest possible bandwidth consistent with the zero-crossing requirement. Suppose, for example, that the solid-line waveform of FIG. 4c represents a binary data signal. Such a signal may be completely specified by (1) the polarity of its initial component, and (2) the locations (in time) of its polarity transitions. Viewing these transition locations as defining a set of real zeros, a continuous, relatively narrow-band signal, analog in form, can be generated by interpolation from these real zeros. Hence the term "real zero interpolation" (RZI). This analog signal has polarity transitions corresponding to the rear zeros of the binary data signal and when subjected to infinite clipping, will yield the original binary data signal except, perhaps, for the polarity factor (i.e., the recovered signal may be phase inverted with respect to the original signal). The process of real zero interpolation therefore, enables, replacement of wideband binary signals with narrowband analog signals which need only be clipped to recover the original signal specifying transitions.

Moreover, we will later describe ways of bringing signals having complex zeros within the realm of real-zero interpolation.

The real-zero interpolation (RZI) process of present concern is illustrated very generally in FIG. 5. A set of mathematically describable operations is performed by the RZI "box" in FIG. 5. When furnished with a signal which specifies a set of real zeros, that box will generate a continuous minimum-bandwidth signal $s_{RZ}(t)$ having the same real zeros.

FIG. 6a shows the input real zeros as points at $t = \ldots t_{i-1}, t_i, t_{i+1} \ldots$ in time. These instants might be covered by the zero-crossings of a binary wave (e.g., output of a limiter) as shown by the dotted lines in FIG. 6a. FIG. 6h shows the final signal $s_{RZ}(t)$ which is continuous, essentially bandlimited, and has the prescribed real zeros.

The theory underlying RZI is based on the trachings in my aforementioned article and is as follows.

$$s_{RZ}(t) = |s_{RZ}(t)| \cdot \cos[\phi s_{RZ}(t)] \quad (10)$$

where:

$$|s_{RZ}(t)| = \exp\left[\int_{-\infty}^{t} H\left[\sum_i \pi\delta(\tau - t_i)\right] d\tau\right] \quad (11)$$

where $$\phi s_{RZ}(t) = \int_{-\infty}^{t}\left[\sum_i \pi\delta(\tau - t_i)\right] d\tau \quad (12)$$

$\sum_i \pi\delta(\tau - t_i)$ = a sequence of Dirac "delta" functions, of strength $\pi$ located at the specified zeros—see FIG. 6b and Equations 14 and 15 below, and H is the Hilbert transform of the bracketed term, e.g., $H[x(t)]$ = the Hilbert transform of $x(t)$ $$= \frac{1}{\pi}\int_{-\infty}^{\infty}\frac{x(\tau)}{t - \tau} d\tau \quad (13)$$

where it is understood that the integral in Equation 13 is to be interpreted in the Cauchy-principal-value sense.

The following points are explanatory; see FIGS. 6a–6h.

(a) Note that $s_{RZ}(t)$ is, by Equations 10, 11 and 12, only a function of the rear zeroes, i.e., the points . . . $t_{i-1}, t_i, t_{i+1}$ . . .

(b) The $\delta$ functions at the real zeros (see FIG. 6b) can be thought of as being defined by $$\pi\delta(t - t_i) = \frac{\pi}{\epsilon}\left(t_i - \frac{\epsilon}{2}\right) < t < \left(t_i + \frac{\epsilon}{2}\right) = 0 \quad (14)$$

elsewhere $$\int_{-\infty}^{\infty} \pi\delta(t - t_1) dt = \pi \quad (15)$$

where $\epsilon$ is a very small positive quantity approaching zero.

(c) The Hilbert (H) transform of a $\delta$ function is, from the general Equation 13.

$$H[\pi\delta(t - t_i)] = \frac{1}{\pi}\int_{-\infty}^{\infty}\frac{\pi\delta(\tau - t_i)}{t - \tau} d\tau = \frac{1}{t - t_i} \quad (16)$$

(This point will be discussed again below; see also Equations 3, 9b of Part I of my paper, "Toward a Unified Theory of Modulation.")

FIG. 6c shows a sum of functions described by Equation 16, the sum being the H-transform of the sequence of impulse functions in FIG. 6b.

(d) FIG. 6d shows the integral of FIG. 6c. Thus, the wave shown in FIG. 6d is the argument of the "exp" function in Equation 11. One might state equivalently that $$l_n|s_{RZ}(t)| = \int_{-\infty}^{t} H\left[\sum_i \pi\delta(\tau - t_i)\right] d\tau \quad (17)$$

where "$l_n$" denotes Naperien logarithm. (Note that a dummy variable $\tau$ is used within the integral of Equations 11, 12 and 17 for clarity.)

Thus FIG. 6d shows the logarithm of the magnitude of the desired output signal.

(e) FIG. 6e shows the "exp" function of (11), which is the desired output magnitude . . . $|s_{RZ}(t)|$.

(f) Turning now to the $\varphi$ function of (12), FIG. 6f shows this function, which is the integral of the sequence of $\delta$-functions shown in FIG. 6b.

(g) FIG. 6g shows $\cos[\varphi s_{RZ}(t)]$ which appears in (10). Because "cos" is a "principal-value" function, it merely alternates between $+1$ and $-1$ values at the real zeros.

(h) Finally, FIG. 6h shows the product (10), i.e. product of FIGS. 6e and 6g. This is the desired output wave.

The processes described above are physically unrealizable in a formal sense. However, they can be approximated with practical apparatus as closely as desired, dependent upon the effort and expense committed.

As examples of formal unrealizability, we note that:

(a) $\delta$-functions, which theoretically are infinitely short in duration and infinitely great in amplitude, are nonphysical.

(b) If FIG. 6d represents the log of FIG. 6e, and if FIG. 6e has zero at $t = t_i, t_i + 1$, etc., then FIG. 6d must have value $-\infty$ at these points because $\log(0) = \infty$. Clearly, this is physically impossible.

Points such as the above do not, however, pose particularly serious problems in practice.

The operations specified in (10)–(12) for generating $s_{RZ}(t)$ can be rearranged to some extent. For example, the argument of the "exp" in Equation 11 can be written (from Equation 16):

$$\int_{-\infty}^{t} H\left[\sum_i \pi\delta(\tau - t_i)\right] d\tau = \int_{-\infty}^{t}\sum_i \frac{1}{\tau - t_i} d\tau \quad (11a)$$

Similarly $$\int_{-\infty}^{t}\sum_i \frac{1}{\tau - t_i} d\tau = \sum_i \int_{-\infty}^{t}\frac{d\tau}{\tau - t_i} \quad (11b)$$

These relationships demonstrate that the effect of Hilbert transformation, on either a single pulse or a sequence of pulses, is to produce a function, or functions, whose basic component is $$\frac{1}{t - t_i}$$

(see Equation 16)

Further, Equations 11a and 11b show that the desired result can be achieved either by (1) integrating a sequence of functions of form $$\frac{1}{t - t_i}$$

or (2) forming a sequence of integrals of $$\frac{1}{t - t_i}$$

for example, if the means for producing the $$\frac{1}{t - t_i}$$

function from the real zero indications is a linear time-invariant device, then a single such device together with a single integrating means may be used to treat the entire sequence of real zero indications, thereby to implement Equations 11a.

On the other hand, with a non-linear means to produce $$\int_{-\infty}^{t}\frac{dt}{\tau - t_i}$$

such as a suitable programmed digital computer, a plurality of such means, including, for example, repeated use of a subprogram within a single digital computer, can implement Equation 11b.

The following will indicate further the range of mathematical equivalants of the process represented by Equations 10 to 12. The right-hand term of Equation 11b may be approximated as follows:

$$\sum_i \int_{t-T_0}^{t}\frac{d\tau}{\tau - t_i} = \sum_i [l_n|t - t_i| - l_n|t - T_0 - t_i|] \quad (11c)$$

where the positive constant $T_0$ is large, by a factor of say 10 or 100, compared to the average time interval between zero indications.

Equation 11c illustrates that the integration of the basic function $$\frac{1}{t-t_i}$$

can be performed directly, resulting in a difference of logarithms. Thus, the argument of "exp" of Equation 11, which is also implicit in Equation 11a, can be implemented without performing a Hilbert transformation or without generating functions of the form $$\frac{1}{t-t_i}$$

The functional equivalence mathematically proven above has the practical consequence that certain operations of the real zero interpolation process of the present invention may be arranged in different sequences and/or combined into composite operations, to the extent that they are derivable from Equations 10 to 12.

We turn now to representative practical apparatus for implementing the RZI process. We discuss this in terms of (10)–(12), with the understanding that variations are possible if said variations are consistent with a description mathematically equivalent to (10)–(12).

First, we shall discuss means for generating the pulses at the input zeros, i.e. the pulse train shown in FIG. 6b. Let us assume that the input to the RZI is the output of a limiter as shown by the dotted lines in FIG. 6a. If this is not the case, we provide a limiter or infinite clipper in the RZI to generate a wave whose transitions between a (+) and (−) state denote the real zero points in time of the input wave. FIG. 7a shows the input wave and FIG. 7b the clipped wave. Note in FIG. 7b that:

$$\frac{d}{dt}[\text{sgn (input)}]$$

is a sequence of pulses of alternating polarity. Such sequence of pulses is shown in FIG. 7c and the modulus of this sequence is shown in FIG. 7d. The FIG. 7d pulses can be obtained by rectification and used "as is." Alternatively, the FIG. 7d pulses can be used to trigger a standard very-narrow-pulse generator so as to produce the pulses shown in FIG. 7e.

FIG. 8 illustrates one exemplary form of zero-crossing detector apparatus 19 for deriving the FIG. 7e pulses from the waveform of FIG. 7a. In that apparatus, the FIG. 7a waveform is passed through a non-linear device 20 which is preferably (but not necessarily) a limiter, and which transforms the wave to accentuate its zero-crossings to make easier the detection of those crossings. When device 20 is a limiter, the result is shown by FIG. 7b.

The output of device 20 is passed through an RC differentiating network 25 comprised of a capacitor 26 and resistors 27. Network 25 provides alternating polarity pulse signals (FIG. 7c) indicative of the occurrences of the zero crossings of the input wave (FIG. 7a). The alternating polarity pulses are then rectified by a full wave rectifier circuit 28 comprised of (a) a pair of forward conducting diodes 29, 30 having their outputs commonly connected to ground through a resistor 31, and (b) an inverting amplifier 32 interposed between the individual input of diode 30 and the common circuit input 32 for both diodes. Rectifier circuit 28 produces a single-polarity pulse output (FIG. 7d) which drives a monostable or "one-shot" multivibrator 33 to produce the narrow zero-crossing indicating pulses shown by FIG. 7e.

Next considered are means for generating the Hilbert transformation of the zero location pulse train (FIG. 7d or 7e) so as to produce the waveform of FIG. 6c from the FIG. 6b pulses.

H-transformation is a linear time-invariant operation and thus might be performable by a linear network. FIG. 9a shows the impulse response which an ideal network would have and FIG. 9b shows the frequency response, i.e., the Fourier transform of the impulse response. Note that FIG. 9b requires only a −90° phase shift; thus an H-transforming network can be thought of as one which converts "cosine" input waves into "sine" output waves. But FIG. 9a shows that such a network is unrealizable because it is noncasual (i.e., has a response before $t=0$) and at $t=0^-$ and $t=0^+$, its response becomes unbounded.

One can, however, approximate the desired characteristics very closely if one permits time delay and requires that the network accept inputs whose frequency components are restricted to a finite passband. FIG. 9c, and FIG. 9d show, respectively, the impulse response and the frequency response of a Hilbert network of $1/\pi t$ form whose response is delayed to $T_0$ seconds and is bandlimited.

Realizable linear networks having characteristics similar to FIG. 9c and FIG. 9d can be synthesized by at least three proven methods as follows:

(1) Delay-line (transversal-filter) techniques as described for different purposes in U.S. Pat 3,050,700 to Powers and as further described in the article by Gouriet and Newell entitled "A Quadrature Network for Generating Vestigal-Sideband Signals," Proc. IEE(B), vol 107, pp. 253–260, May 1960.

(2) Single-sideband frequency-translation techniques of the type disclosed by me in my publication "Demodulation of Single-Sideband Signals Via Envelope Detection," IEEE Trans. Comm. Tech., vol. Com–14, February 1966.

(3) Use of all-pass networks in cascade. Such networks change the phase but not the magnitude of impressed signals. By using enough all-pass sections, any phase characteristics [e.g. that of FIG. 9d] can be closely approximated over a band of frequencies at the expense of time delay. Synthesis procedures are available in texts on network theory.

It should be noted, however, that for RZI according to the invention, one is not restricted to linear time-invariant changers. That is, because of considerations now to be discussed (especially F3) one can use a very flexible combination of digital and linear-analog techniques. Those considerations are as follows.

F1: Any physical H-transforming device must involve time delay.

F2: Any physical H-transforming device must have a limited passband or frequency response. Stated differently, the device must have limited "resolution" in the time domain, and limited low-frequency response.

F3: In RZI apparatus, we desire only to H-transform "isolated" pulses (at the real zeros of the input) whose heights are a known standard (i.e., are standardized). We do not require that a H-transform device for RZI respond correctly to "any" signal, but only to pulses.

Thus, the apparatus 39 of FIG. 10 is adapted to provide H-transforms suitable for our purposes. That apparatus works as follows in the manner illustrated by FIGS. 11a–11d.

The zero-location pulses are applied to a 2N-stage binary shift register 40. Shifting pulses cause the location pulses to proceed down the register, as a sequence of "0" or "1" states, at a rate of $1/T_s$ stages per second.

The (−) outputs 41 of the first N stages supply currents to an adding circuit 42 through a resistor matrix 43, as do the (+) outputs 44 of the last N stages. The resistors are graded approximately as $[1+2|n|]$ so that the left- and right-hand resistors are much larger than the middle pair. By convention, when a stage is in the "0" state it supplies no currents to 42; when it is in the "1" state, it will supply a (+) or (−) current to 42 depending on its position in the register and its associated resistor value. FIGS. 11a, b, c show the relevant waveforms when a single pulse is applied at $t=0$ zero location.

The stages of a conventional shift register do not provide what would ordinarily be termed (+) and (−) outputs. Instead, each stage of a conventional shift register has (a) a normal output terminal which yields "no current" and "current" when, respectively, a "0" and a "1"

bit are stored in that stage, and (b) a complement output terminal which yields "current" and "no current" for stored "0" and "1" bits, respectively. For a conventional shift register used in the FIG. 10 system, the shown outputs 41 are complement output terminals, and the shown outputs 44 are normal output terminals. When the register is empty (i.e., each stage of the register contains a "0" bit), then no current will flow from any of outputs 44, but a current will flow from each of outputs 41. The sum of the currents from outputs 41 establishes in adding circuit 42 the reference level shown in FIG. 11c for the current or voltage of the waveforms generated when a zero location pulse (FIG. 11b) passes through the stages of the register. That is, as the input pulse passes into the leading stage, the output from the complement terminal 41 of that stage changes from "current" to "no current." That change in current produces (in conjunction with associated resistor 43 and adding circuit 42) a step-like decrease in current or voltage from the mentioned reference level, and such decrease corresponds to the leading waveform shown in FIG. 11c.

The description just given should make it self-evident how the following stages of the register cooperate with their respective resistors 43 and circuit 42 to produce the other shown step waveforms of current or voltage (FIG. 11c) relative to the shown reference level. The reference level itself may be eliminated from the output of circuit 42 by the use of a biasing or blocking capacitor or the like.

The optional lowpass filter 50 shown in FIG. 10 can be used, with or without re-sampling at its input, to smooth the "staircase" waveform emerging from the adding circuit. The grading of the resistor matrix is somewhat dependent on the actual filter which is used. The analysis and weighting techniques disclosed in the aforementioned article by Gouriet and Newell are directly applicable to the FIG. 10 device.

The FIG. 10 apparatus also furnishes a delayed replica of the input zero location pulses via the pulse generator 51 in FIG. 10 which responds to the leading edge of the output from the "+0" stage of the register. The delayed replica pulse is shown in FIG. 11d.

The "resolution" of the FIG. 10 apparatus is set by the register shifting rate. For shift pulses at 100 kHz. rate, input zeros at a spacing of $10\mu_s$. can be resolved, albeit with some loss of location accuracy. Faster shift rates naturally improve the resolution.

The low frequency response is set by the effective temporal "length" of the register. The low frequency cutoff is approximately $1/2NT_s$ Hz. or $1/NT_s$ Hz., depending on the criterion used and the resistor grading. Thus a 200 stage register operating at $10^5$ shifts/sec. has a low frequency cutoff between 250 and 500 Hz.

The exact relationship between low frequency cutoff of the Hilbert device and the properties of the signal which should emerge from the whole interpolator apparatus under ideal conditions is quite complicated. It is relatively easy to show that if the final output is periodic in T seconds, then the low frequency cutoff of the Hilbert device need only be less than $1/T$ seconds. When the output signal is not periodic, the situation is much more complicated. For many such signals, a Hilbert low cutoff less than the reciprocal of twice the greatest spacing (in seconds) between zero crossings suffices; for other such signals, however, the low frequency cutoff must be lower than this by a factor of 2 or more.

While it is possible to assign a high cutoff frequency to such devices in accordance with a given cutoff criterion, this parameter is less meaningful. The "resolution" referred to above, which is $T_s$, i.e., the reciprocal of the shifting rate or the spacing between shift pulses, is a more useful parameter.

It can be readily shown that the (idealized) final output signal must not contain components at frequencies above $1/2T_s$ Hz.; indeed, this upper limit can be achieved only when the desired output signal is a single sinusoid of frequency $1/2T_s$ Hz. For the more complicated signals normally met in practice, the resolution (and hence the shift rate) should be chosen such that the highest component in the signal does not exceed $1/MT_s$ Hz., where M is a number of order 10.

Note that the performance is set by the "complexity" (number of stages) of the register and by its shift rate. For a given complexity, the operating passband can be moved merely by changing the shift rate (and retuning the lowpass filter). The feature just mentioned represents a significant advantage over linear lumped-constant H-networks whose passband is essentially fixed.

The output of the Hilbert transform device is a succession of signals, each of which has a waveform of the general shape shown by FIG. 9c or (in dashed outline) by FIG. 11c. Those signals are integrated by the device 60 (FIG. 13). The integration can be performed by standard and well known electronic integrating circuits of the analog-computer type, or even by a simple RC network with a very long time constant. For examples of relevant techniques, reference is made to my U.S. Pat. 2,969,183 issued Jan. 24, 1961.

Following the integration, the next operation performed is to generate "exp" (i.e., antilog) of the function shown in FIG. 6d, i.e. to generate the wave corresponding to FIG. 6e. The operation is of itself well known, reference being made in this connection to U.S. Pat. 3,054,073 to Powers.

One way to effect the "exp" generation is to use a general nonlinear function generator, e.g., of the "diode break-point" variety which is widely employed in analog computers.

A simpler and generally adequate technique is to build a special "exp" function generator 65 (FIG. 13) which, for example, exploits the physical properties of forward-biased semi-conductor diodes. FIG. 12 shows representative circuitry for such a generator.

In the FIG. 12 circuit, $T_1$ and $T_2$ are a negative feedback amplifier which develops, across diode D, a voltage proportional to the negative of the input. The current $i_D$ in D is approximately exponentially related to the impressed voltage $V_D$ as shown by the equation of the figure. But, nearly all of the diode current must flow in the collector of $T_2$, and hence the voltage developed across Rc is approximately proportional to $(-1)\cdot\exp[K_3\cdot(-1)\cdot(\text{input voltage})]$ wherein the first and second $(-1)$ terms come from, respectively, the inversion in the transistor $T_2$ and the inversion in the $T_1$ plus $T_2$ feedback amplifier. Note that, if the FIG. 12 circuit is used as shown, then that circuit should have as an input the negative of the signal from the integrator 60 of FIG. 13. Alternatively, numerous other well known amplifier configurations which are not characterized by the mentioned inversions can be used in conjunction with diode D. Note in connection with such diode that the variable bias B sets the operating point on the diode characteristic and ensures that the drive amplifier is biased for linear operation.

Yet another method for exponentiation would be to use conventional high speed digital computing techniques to compute the "exp" of closely spaced samples of the input wave.

The preceding sections describe methods to generate $|s_{RZ}(t-T_0)|$, i.e., the modulus of the desired output delayed by $T_0$. This is a delayed version of FIG. 6e. Recall that the delay $T_0$ is associated with realization of the H-transformation step. Thus, we have one of the factors of a delayed version of (10).

We also desire to produce a delayed version of FIG. 6g, the wave which controls polarity reversal and is the other factor in (10). Observe that, if we merely wished to produce the wave of FIG. 6g without delay, we could do so by applying the zero-location pulses to an ordinary "flip-flop" or binary divider circuit so that we would not produce the wave shown in FIG. 6f. We could, in fact, use the sgn [input] directly as it appears in FIG. 7b as the dotted wave in FIG. 6a.

But we desire to produce a version of FIG. 6g delayed by $T_0$ seconds. To do this, we can either provide a mechanism for (a) delaying sgn [input] by $T_0$ seconds or for (b) delaying the zero-location pulses which, after delay, are "divided" in a flip-flop. The choice depends, in practice, on what means are used to effect H-transformation in the steps discussed previously. If either the linear technique described (for different purposes) in U.S. Pat. 3,050,700 or the digital technique disclosed herein [FIGS. 10, 11] is used, one can take advantage of delay mechanisms already provided for the new use of H-transformation. For example, in FIGS. 10, 11, means 51 are shown for producing a properly delayed replica of each zero-location pulse. The delayed replica pulses can be applied directly to a flip-flop 75 (FIG. 13) to generate the delayed version of FIG. 6g.

The final step is multiplication by a multiplier means 85 (FIG. 13) of the delayed versions of FIG. 6e and FIG. 6g. One could use well-known analog computer means for that purpose, but simpler methods can also be used because one of the signals to be multiplied has but two amplitude states, $+1$ and $-1$.

Thus, for multiplier 85 one can employ a switched diode quad multiplier sometimes known as a balanced modulator, or a balanced linear gate, or numerous other piece-wise linear circuits wherein the polarity state of the delayed FIG. 6g wave is used to select either a positive or negative version of the delayed FIG. 6e wave. Comparing waveforms 6e and 6g, it will be seen that the effect of multiplier 85 is to reverse the polarity of every other signal segment of the succession of signal segments comprising waveform 6e. In this way the multiplier 35 provides at its output the sought-for real zero component signal $s_{RZ}(t-T_0)$, i.e., a delayed version of the signal shown by FIG. 6h.

FIG. 13 illustrates a representative system employing the components and techniques which have been discussed above. Such a system has been tested experimentally and was found to perform in accordance with theory, within the response limitations of its physical components.

As demonstrated in connection with Equations 10 to 12, 11a to 11c, various rearrangements of certain operations of the real zero interpolation process are possible. Also, in the preceding discussion we have tended to disregard amplitude scale factors such as "$\pi$." In practice, such constants are important only at one point in the operations, namely, the nonlinear "exp" circuit 65. Here, by providing an adjustment for the gain of the feedback drive amplifier in FIG. 12 (e.g. by making $R_1$ variable) as well as by providing adjustment for the bias on the diode via B, one can equalize as needed in a very straight forward fashion.

Considering the signal $s_{RZ}(t-T_0)$ which is the output of the FIG. 13, system, such signal is (with a delay $T_0$) the same as the signal $s_{RZ}(t)$ of FIG. 6h. That output has zero crossings which replicate (with a delay $T_0$) the zero crossings of the input signal (FIG. 7). The overall effect of the FIG. 13 system is to interpolate between the zero crossings of the output signal by consecutive contiguous segments which are alternating in polarity and of which each sgement extends over an interval between ad-jacent two of such crossings. Each such segment over its respective interval is of single polarity and is matematically continuous in the sense that, no matter how many times the waveform of the segment is differentiated, the resulting derivative curve is a continuous curve. Also, the peak amplitude of the several segments of the output signal is variable (see FIG. 6h) in accordance with the variable relative occurrences in time (or other dimensional extension of the output signal) of the zero crossings of the output signal. Note, in this connection that the peak amplitude of each segment varies in the same sense as the length of the interval spanned by that segment.

The succession of signal segments form together the signal $s_{RZ}(t-T_0)$ which preserves the zero crossings of the input signal and which is mathematically continuous and bandlimited in the sense that any spurious spectral components (outside the theoretical bandwidth for the signal) can be reduced to as small a value as desired at the price of some increase in the cost of equipment and some increased time delay. Moreover, the described signal $s_{RZ}(t-T_0)$ is the signal of minimum bandwidth which preserves all the zero crossings of the input signal.

I deem it to be an important feature of the FIG. 13 system that it is a true interpolator. That is, the only significant information needed by such system is that of the relative times of occurrence (or positions of occurrence) of the zero-crossings of the input signal to the system. From that information only, the system is capable of interpolating between such occurrences so as to provide the bandlimited $s_{RZ}(t-T_0)$. The FIG. 13 system is thus to be distinguished from pulse filtering networks and the like wherein the energy content of the input pulse as well as its time of occurrence are significant factors in the operation of the network. That is, the operation of the FIG. 13 system does not essentially depend on the presence therein of any bandwidth limited filters.

In the foregoing discussion, we introduced the following models for the bandlimited signal $s(t)$.

$$s(t) = \sum_{K=0}^{n} C_K \cos [K\Omega t - \theta_K] \Omega = \frac{2\pi}{T} \quad (1)$$

$$= s_{RZ}(t) \cdot s_{CZ}(t) \quad (3)$$

Expression (1) is a conventional Fourier series which may contain an arbitrarily large (but finite, for convenience in analysis) number of terms. Expression (3) is the factorization of $s(t)$ into real-zero and complex-zero components. Henceforth, we shall say, by convention, that $s_{RZ}(t)$ contains only first-order RZ's. Higher odd order RZ's are decomposed into [1st and even] order, and the even-order RZ's are subsumed into $s_{CZ}(t)$.

We have shown that, if the (first order) real zeros of $s(t)$ are specified and are applied to the RZI apparatus (FIG. 13), it is possible to generate a wave essentially identical to $s_{RZ}(t)$ except perhaps for an amplitude scale factor of $(+)$ or $(-)$ polarity.

In other words, we have shown that (except for a constant factor):

$$s_{RZ}(t) = \text{RZI } [G\{s(t)\}] \quad (18)$$

where RZI means "real-zero interpolated form of the argument," and G is a zero-crossing-preserving transformation such as "sgn," i.e. infinite clipping. Thus, G destroys or distorts complex-zero information which the RZI process does not reconstitute.

We shall know how that, except for a constant multiplication factor and perhaps an additive constant, $$s(t) = Z^{-1}[\text{RZI } \{G[Z\{s(t)\}]\}] \quad (19)$$

where $$Z\{s(t)\} = s_{R'Z}(t), Z:ZCP \quad (20)$$

$$Z^{-1}[Z\{s(t)\}] = K_1 s(t) + K_2 \quad (21)$$

where $K_2$ may sometimes=0.

We shall explain the meaning of (19)–(21) in steps.

We have pointed out that $s(t)$, usually has complex zeros and G is constrained to retain only zero-crossing information. Therefore, $s(t)$ usually cannot be recovered from $G[s(t)]$ because of the loss of complex zero information.

By (20), however, we postulate a transformation Z which, when applied to $s(t)$, converts $s(t)$ into a wholly first-order real zero signal designated $s_{R'Z}(t)$. Further, the notation "Z:ZCP" means that the transformation Z is zero-count preserving. That is, if $s(t)$ has $N_R$ 1st order real zeros and $N_C$ complex zeros, then $s_{R'Z}(t)$ will contain $N_{R'}$ 1st order real zeros where $$N_{R'} = N_R + N_C \qquad (22)$$

Z:ZCP thus insures that Z will preserve the bandwidth of $s(t)$.

Because of the nature of Z, the quantity $$G[Z\{s(t)\}] = G[s_{R'Z}(t)] \qquad (23)$$

which contains the zero-crossing information of $s_{R'C}(t)$ will also contain enough information to reconstitute $s(t)$. In other words, Z converts the complex zeros or $s(t)$ into real zeros which G does not destroy.

By the nature of the RZI process we can write $$RZI\{G[s_{R'Z}(t)]\} = s_{R'Z}(t) \qquad (24)$$

which is merely a restatement of (18). In words, the RZI apparatus earlier described uses the zero-crossing information retained by G to "rebuild" $s_{R'Z}(t)$.

The transformation $Z^{-1}$ is the inverse of Z, i.e., it "undoes" Z. Thus by (21) and (20):

$$Z^{-1}[s_{R'Z}(t)] = K_1 s(t) + K_2 \qquad (25)$$

because $$Z[s(t)] = s_{R'Z}(t) \qquad (20)$$

Thus the application of Z, then $Z^{-1}$, to $s(t)$ yields a linear function of $s(t)$ wherein the $K_1$ in Equation 25 denotes a proportionality constant, and $K_2$ denotes an additive constant (i.e., direct current component). The values of these constants depend on the specific nature of the postulated Z, $Z^{-1}$, as the following exemplary embodiments will show.

Thus we have explained (19)–(21). To summarize:

$s(t)$}real and complex zeros $\downarrow Z$ $P \begin{cases} s_{R'Z}(t)\text{\}wholly 1st order real zeros} \\ \downarrow G \\ G[s_{R'Z}(t)]\text{\}preserves only zero crossing information} \end{cases}$ $\downarrow RZI$ $s_{R'Z}(t)$}wholly 1st order real zeros $\downarrow Z^{-1}$ $K_1 s(t) + K_2 \Big]$ if $K_2 = 0$, the zeros are exactly as in $s(t)$ at the top The desirability of this process is explained by the region above labelled P, where we have a signal which can be specified wholly in terms of zero crossings. Such signals are often convenient for engineering purposes. This is especially true when we can recover the original signal from the zero-crossing information.

In the description which follows, we shall show that Z, $Z^{-1}$ can be realized with practical techniques by which Z converts complex zeros to (first order) real zeros and $Z^{-1}$ "undoes" Z. In this connection, we note that ZCP (zero count preserving) techniques are advantageous because they lead to signals which are either minimum bandwidth or minimum real-zero-rate, consistent with the requirement that $s(t)$ be recoverable.

A ZCP process does not contain, in its output frequency components whose frequency is higher than the highest frequency in the input to the process. Thus, we can write $$\underbrace{\sum_{K=0}^{n} C_K \cos[K\Omega t - \theta_K]}_{s(t)} \underset{Z^{-1}}{\overset{Z}{\rightleftarrows}} \underbrace{\sum_{K=0}^{n} b_K \cos[K\Omega t - \phi_K]}_{s_{R'Z}(t)}$$
$$(26)$$

where the left-hand side is $s(t)$ as described by (1), and the right-hand side is the wholly first-order real-zero process $s_{R'Z}(t)$.

For a non-ZCP process, the right side of (26) would be a sum over a larger, perhaps infinite, collection of frequencies.

There are two salient characteristics of (26):

(1) No higher frequencies are generated in the output signal than those in the input signal.

(2) Z is reversible, i.e., $Z^{-1}$ exists and needs, at the worst, only to be supplemented by an additive constant and/or a multiplication constant.

The properties just stated generally characterize linear (time-invariant) transformations. Linear (time-invariance assumed henceforth) transformations, in turn, are characterized by the property of superposition. Thus, the $[b_K, \phi_K]$ parameters of the $k$th frequency component of the output of Z are determined by the action of Z on the $k$th (and only the $k$th) frequency component of the input.

Now it can be shown that, for Z to produce a wholly 1st order read-zero output signal, it must produce at its output a frequency spectrum which could grossly be called "rising with frequency." The minimum or precise spectrum changes which Z must effect on a particular $s(t)$ can only be determined when the input signal $s(t)$ is specified.

One can, however, state various gross general criteria for Z. For example, a mathematically sufficient criterion is that the output spectral coefficients satisfy:

$$|b_0| < |b_1| < |b_2| < \cdots < |b_{n-1}| < |b_n| \qquad (27)$$

Expression (27) characterizes a consistently rising spectrum. That is, if Z modifies the spectrum of the $s(t)$ input such that (27) is satisfied, then the output of Z will assuredly have only 1st order real zeros. Expression (27) is not mathematically necessary, however, for the reason that one can find signals having only 1st order RZ's which do not satisfy (27).

The proof of these properties of (27) is not trivial, and (27) is not a "sharp" or concise criterion. Nevertheless, it is helpful in indicating what types of physical transformations are acceptable Z's. In general, they are transformations which "emphasize high frequency content."

In general, zero conversion can be effected by any linear filtering process which "tilts" the spectrum of $s(t)$ upward sufficiently. One process of this sort is repeated differentiation. Defining:

$$D^m = \frac{d^m}{dt^m} \qquad (28)$$

consider:

$$D^m[s(t)] = D^m \sum_{M=1}^{n} C_K \cos[K\Omega t - \theta K] \qquad (29)$$

$$= \sum_{K=1}^{n} C_K D^m[\cos(K\Omega t - \theta_K], \; m \geq 1 \qquad (30)$$

$$= \sum_{K=1}^{n} C_K [K\Omega]^m \cdot \begin{Bmatrix} + \\ \text{or} \\ - \end{Bmatrix} \begin{Bmatrix} \sin(K\Omega t - \theta_K) \\ \text{or} \\ \cos(K\Omega t - \theta_K) \end{Bmatrix} \qquad (31)$$

where $(+)$ or $(-)$, and "sin" or "cos," is determined in (31) by what particular value of $m$ is used, i.e., how many times $s(t)$ is differentiated.

Suppose, by way of example, that $s(t)$ is differentiated five times. The magnitudes of the spectral coefficients are then $$C_1 \Omega^5, \; C_2(2\Omega)^5, \; C_3(3\Omega)^5 \; \ldots \; C_n(N\Omega)^5 \qquad (32)$$

Clearly, when $s(t)$ contains a finite number of terms, one can always satisfy (27) by differentiating $s(t)$ a finite number of times.

Note that, as $m \to \infty$, the highest spectral term becomes stronger and stronger relative to the lower-frequency components. Thus, the differentiated $s(t)$ signal approaches a steady sinusoid at angular frequency $n\Omega$. such a sinusoid has $2n$ first order real zeroes (zero crossings) per second, which is the maximum number possible (i.e., all zeros have been converted into 1st order real zeros).

Hence, it is clear that, for an input signal which is periodic and bandlimited, a finite number of differentiations will convert it into an all 1st order RZ wave of the same bandwidth. This process is thus an admissible Z transformation.

A suitable $Z^{-1}$ transformation consists of integrating the real-zero wave exactly as many times as it was differentiated.

The only ambiguity introduced by $(Z, Z^{-1})$ is loss of the zero-frequency or DC component in the original signal. This occurs at the first differentiation, as can easily be shown by allowing the index K in Equation 29 to range from zero (rather than unity) to $n$. The K=0 term in the signal model vanishes at the first differentiation, and usually cannot be recovered upon subsequent integration unless the integrator is supplied with "extra" or "side" information specifying a constant of integration.

In terms of the constants $K_1$, $K_2$ of Equations 21 and 25, it is clear that $K_1$ can represent the overall amplification or attenuation of the apparatus which should be constant over the frequency range of the signal. $K_2$, however, can be construed as a component opposite in polarity to $K_1 \times$(DC component of $s(t)$) such that the final signal possesses no constant component (due to cancellation by $K_2$). Alternatively, $K_2$ could represent an arbitrary DC level (constant of integration) imposed at the last stage of integration. For speech and many similar signals, this loss of DC is immaterial.

Thus far we have discussed only periodic bandlimited signals. Signals of interest in the real world are never precisely periodic nor bandlimited. Thus, we have two practical considerations as follows.

First, the $s(t)$ signal, in practice, is preferably passed through a bandwidth-limiting filter whose attenuation rate, beyond the cutoff freqeuncy, is at least $\{-6[m+1]\}$ decibels per octave, where $m=$number of differentiations to be applied to the signal.

Second, for (essentially) bandlimited random signals such as speech, an infinite number of differentiations may be required in theory to assure conversion of all complex zeros to 1st order real zeros. However, for a finite number of differentiations, the number of zeros converted by each successive differentiation increases monotonically and approaches the desired goal quite rapidly. Thus, it is possible in practice to convert "nearly all" zeros with a finite number of differentiations. The proportion of unconverted zeros can be made as small as desired (but cannot usually be forced to be exactly zero).

FIGS. 14a and 14b show apparatus for zero conversion via linear filtering. In FIG. 14a, the filter 95 suppresses out-of-band components of $s(t)$ which, while unwanted, would be enhanced by the subsequent operations. The "linear network" 96 has a rising frequency characteristic and can be (though it need not be) implemented by cascading conventional differentiating networks. Alternatively, one can synthesize ladder networks (for example) which have rising characteristics. The optional zero crossing counter 97 is a conventional events-per-unit-time device which gives the crossing rate. If the count of crossing rate is not sufficiently close to 2W counts/sec., the network 96 should be adjusted so as to further enhance high frequencies. The apparatus of FIG. 14a precedes the system shown in FIG. 13 so that the output of the FIG. 14a apparatus is the input of the FIG. 13 system.

In FIG. 14b, one applies the wholly real-zero signal $s_{R'Z}(t)$ to a network 106 which is the inverse of the network 96 of FIG. 14a. The result is the original signal $s(t)$, possibly multipled by a constant $K_1$ and without its original zero-frequency or DC component. The network 106 follows the shown FIG. 13 system so that the output of that system is the input to the network. Thus, the complete zero conversion system disclosed herein is comprised in the order named of (a) the apparatus of FIG. 14a, (b) the RZI system of FIG. 13, (c) the network of FIG. 14b.

Zero conversion provided via filtering as just described does not exhaust the possibilities for spectral "tilting" by linear means. We will now discuss a technique based on adding to $s(t)$ another predictable signal such that the composite signal is wholly (first-order) real zero and of the same bandwidth as $s(t)$, i.e., the process is zero-count preserving (ZCP). As we have noted, ZCP is not an essential property; it is merely desirable.

Let us define:

$$s_C(t) = s(t) + c(t) = c(t) + \sum_{K=0}^{n} C_K \cos[K\Omega t - \theta_K] \quad (33)$$

If $s_c(t)$ is bandlimited to $n\Omega$ radians/sec., then $c(t)$ can have no frequency components greater than $n\Omega$. Moreover, it is desired that $c(t)$ be predictable, i.e., removable or separable from $s(t)$ in a $Z^{-1}$ process, and be such as to ensure that $s_c(t)$ is wholly real-zero.

The simplest $c(t)$ which will meet these requirements is a sinusoidal wave of angular frequency $n\Omega$ and magnitude Q.

Thus:
$$c(t) = Q \cos(n\Omega t) \quad (34)$$
and
$$s_C(t) = Q \cos(n\Omega t) + \sum_{K=0}^{n} C_K \cos[K\Omega t - \theta_K] \quad (35)$$

where Q is chosen large enough so that $s_c(t)$ is wholly first order real-zero.

Note that (35) generally does not satisfy (27). That is, while the magnitude of the highest component, $$[(Q+c_n \cdot \cos\theta_n)^2 + (c_n \cdot \sin\theta_n)^2]^{1/2} \quad (36)$$

is usually significantly larger than any other component, the $(n-1)$th component need not be larger than the $(n-2)$th component, etc. Note, however, that violation of (27) is not "fatal," for (27), while a sufficient criterion, is not a necessary criterion for wholly-real-zero signals.

Now imagine that Q in (35) is very large indeed. Then $s_c(t)$ will be very similar to a steady cosine wave of frequency $n\Omega$ rad./sec. and will have the desired 2W zero crossings/sec., where $W = n\Omega/2\pi$. This real-zero rate will be essentially constant as Q is made smaller but the zeros will become more irregular in time, until, for some value of Q, the zero crossing rate will decrease and $s_c(t)$ will cease to be a wholly first-order real-zero signal.

The minimum value of Q needed for essentially complete conversion of the zeros in a signal $s(t)$ depends very much on the proportions of $s(t)$. A sufficient but not necessary condition for complete conversion is:

$$Q \geq |s(t) \cos n\Omega t + H[s(t)] \sin n\Omega t| \quad (36)$$

where $H[s(t)]$ is the Hilbert transform of $s(t)$, and $n\Omega$ is the highest radian frequency in $s(t)$. The mathematical proofs of (35) and (36) are rather elaborate but can be adduced.

Experimental results, which agree with theoretical calculations, show that Q strengths +3 db to +10 db greater than the power of $s(t)$ usually effect essentially complete zero conversion.

The necessary "Q power" can be decreased by combining the filtering methods previously described (in connection with FIGS. 14a, 14b) with Q-component addition. Thus, some of the complex zeros can be converted via filtering, e.g. differentiation, and the remaining zeros can be converted via the additive component. The best "blend" of these techniques depends on the properties of $s(t)$, the application in which the techniques are applied, etc.

The $Z^{-1}$ process corresponding to the [$c(t)$-additional]

Z process is, of course, removal of $c(t)$. Because $c(t)$ is predictable, its removal can be done in a number of ways. For example, for $c(t) = Q \cos n\Omega t$, a "notch filter" suffices. Such a filter has a very high attenuation in region $\omega = n\Omega$, and low attenuation elsewhere. Other techniques, e.g. subtraction of $c(t)$, are also possible.

If $s(t)$ tends to be intermittent in nature, e.g. speech, the overall "Q power" can be decreased by causing it to vary slowly with the short-term average strength of the signal power.

If the $c(t)$ component is added to $s(t)$ without any DC-component-destroying operations such as differentiation, the final output after the $Z^{-1}$ process will contain the DC component. Thus, zero conversion via an additive $c(t)$ component is additive-constant-preserving although the RZI process may change the polarity of the signal (including the additive constant) as a whole. In terms of Equations 21 and 25, the constant $K_2$ is uniquely zero and $R_1$ represents an overall, possibly negative, constant associated with overall amplification.

FIG. 15a shows apparatus for sine wave addition with facilities for optimal spectral "tilting" as in FIG. 14a. In FIG. 15a the signal $s(t)$ is passed through components 95 and 96 (as in FIG. 14a) and is then supplied to one input of an adder 111. A sinusoidal signal $\cos n\Omega t$ is generated by a source 112 and is passed through an amplifier 113 to become the signal $Q n\Omega t$. The value of $Q$ is determined by the gain of amplifier 113, and such gain is adjustable by either one or both of a short term power measurement unit 114 or the zero crossing counter 97. Unit 114 operates to maintain $Q$ at values determined by, say, expression 36 and counter 97 operates to maintain $Q$ at a value such that the actual count of zero crossing rate by element 97 is the same as or a predetermined fraction of the theoretical rate of 2W zero crossings/sec. As indicated by their dotted outlines, components 97 and 114 are optional. Moreover, in many applications the component 96 may be omitted so as to provide for feeding of the signal $s(t)$ directly into adder 111.

Element 111 operates to combine in additive relation the two imputs thereto. The output of the adder is supplied as the input to the RZI system shown in FIG. 13.

FIG. 15b shows apparatus for effecting the $Z^{-1}$ transformation which is the inverse of the Z transformation produced by the circuit of FIG. 15a. In FIG. 15, the output of the RZI apparatus of FIG. 13 is passed through a notch filter 121 tuned to $\cos n\Omega t$ and then through the network 106 also shown in FIG. 14b. Notch filter 121 removes the component $\cos n\Omega t$ from the signal while network 106 "undoes" the operations on the signal which were effected by network 96 in FIG. 15a. Evidently, if component 96 is omitted from the Z transforming apparatus of FIG. 15a, network 106 is also omitted from the $Z^{-1}$ transforming apparatus of FIG. 15b.

Apart from zero conversion, the RZI apparatus of FIG. 13 is useful in the application among others of the transmission of fascimile signals, binary data signals and other signals which are pulses or include pulses as a component of the signal. Such signals are non bandlimited and, when transmitted in a conventional manner, require an undesirably wide bandwidth in order to avoid undue distortion of the signal at the receiving end. As shown in FIG. 16, by the use of the RZI apparatus, however, a non-bandlimited signal of such sort from source 120 is converted by the foregoing RZI apparatus 122 into an essentially bandlimited $s_{RZ}$ signal which, for transmission purposes, is of minimum bandwidth but which when received, may be converted (by clipper 124 or other non-linear transforming device) back into the original non-bandlimited signal.

Thus, the RZI apparatus reduces or compresses the bandwidth required for adequate transmission of a signal of such sort.

When the FIG. 13 apparatus is used in conjunction with the apparatus of FIGS. 14a, 14b (or 15a 15b) which effects conversion of complex zeros to real zeros and reconversion of such real zeros back to complex zeros, the system has the useful application among others that it permits speech, television or like signals to be transmitted, processed or recorded and reproduced without the introduction into the signal of amplitude distortion caused by non-linearity in the operation in question. For example, a television signal may be recorded on and reproduced from magnetic tape without being distorted in amplitude by the non-linear recording-reproducing characteristic of the tape by utilizing the FIG. 14a (or 15a) device to convert the original television signal into an all-real-zero signal, clipping the last named signal by limiter 20 (FIG. 8), recording the clipped signal on the tape, subsequently reproducing the clipped signal and supplying it as an input to network 25 (FIG. 8), and processing that signal by the remainder of device 19 (FIG. 8), the other components of the RZI apparatus and the FIG. 14a (or 15a) apparatus so as to recover the original television signal.

The above described embodiments being exemplary only, it is to be understood that additions thereto, modifications thereof and omissions therefrom can be made without departing from the spirit of the invention and that invention comprehends embodiments differing in form or detail from those specifically disclosed.

What is claimed is:

1. A signal processing system for an input electrical signal varying between positive and negative amplitudes; the instants of zero amplitude thereof being defined as zero crossings, comprising, means for generating a unidirectional pulse at each instant of zero amplitude of said input signal, thereby to produce a train of pulses representing the zero crossings of said input signal, means coupled to said pulse generating means for producing, for each of said pulses, an output signal having a waveshape described by the function $$\frac{1}{t - t_i}$$

where $t$ represents total elapsed time and $t_i$ represents the time of the zero crossing, means to integrate said output signals, means to exponentiate said integrated output signals so as to generate a succession of contiguous signal polarity signal segments, and means operative in response to successive zero crossings of said input signal to reverse the polarity of alternate ones of said segments to thereby derive therefrom a bandlimited signal which preserves the zero crossings of said input signal.

2. The signal processing system of claim 1 wherein said means for producing said output signals for each of said input pulses comprises circuit means for effecting a Hilbert transformation.

3. A signal processing system for an input signal describable by a first mathematical function having both real and complex zeros comprising, first signal transforming means to convert said input signal into a form describable by a second mathematical function related to said first function such that at least some of the complex zeros of said first function are converted into real zeros, whereby the ratio of the number of real zeros to the number of real and complex zeros combined is greater in said second function than in said first function, real zero interpolation means responsive to said converted signal to derive therefrom a bandlimited signal, and second signal transforming means responsive to said bandlimited signal to invert the transformation effected by said first means so as to provide an output signal describable by a mathematical function having real and complex zeros corresponding, respectively, to the real and complex zeros of said first function, except for zero displacements caused, if at all, by an additive constant component.

4. A system as in claim 3 in which said first signal transforming means is comprised of differentiating network means and said second signal transforming means is comprised of integrating network means effecting a signal transformation which is the inverse of that effected by said differentiating network.

5. A sytem as in claim 3 in which said first signal transforming means is comprised of means providing a sinusoidal signal of a frequency at least equal to the frequency component of said input signal selected as the highest frequency component thereof, said first signal transforming means being also comprised of adder means to combine said input signal and sinusoidal signal so as to provide said converted signal, and in which said second signal transforming means is comprised of means to remove the component correspondng to said sinusoidal signal from the signal received by said second signal transforming means.

6. A system as in claim 5 in which said first signal transforming means is further comprised of network means in cascade with said adder means to subject said input signal to a selected number of differentiations, and in which said second signal transforming means is further comprised of network means following said component removing means to subject the output of said component removing means to a selected number of integrations providing the inverse of said selected number of differentiations.

7. A system as in claim 5 in which said second signal transforming means is comprised of means to filter out the component corresponding to said sinusoidal signal from the signal received by said second means.

8. A system as in claim 5 in which said second signal transforming means is comprised of means to subtract the component corresponding to said sinusoidal signal from the signal received by said second means.

9. An interpolation system for generating a continuous output signal from a sequence of spaced indicia separated by finite intervals comprising, means for providing a succession of input signals corresponding in spacing to said indicia, means responsive to said input signals to produce a succession of signal segments having a waveform representative of the combination of integration and Hilbert transformation of said input signals, means responsive to said succession of signal segments to produce an output whose waveform is the exponential of the waveform of said succession of signal segments, and polarity control means operative in response to successive input signals to render of alternately opposite polarity the successive signal segments of said output thereby to produce said continuous output signal.

10. A system as in claim 9 in which said input signal providing means comprises, non-linear signal transfer means responsive to an applied signal having zero crossings at finite intervals to accentuate said crossings, said zero-crossings comprising said spaced indicia, and zero-crossing detector means responsive to said accentuated zero-crossings to derive therefrom said succession of input signals in a form wherein such input signals are separated by intervals corresponding to those between said zero-crossings of said continuous signal.

11. A system as in claim 9 in which said succession of input signals is in the form of a stream of pulses.

12. A system as in claim 9 further comprising non-linear circuit means responsive to said continuous output signal to derive therefrom a succession of pulses separated by intervals corresponding to those separating said sequence of indicia.

13. A system as in claim 9 in which said input signal responsive means comprises, shift register means comprised of a plurality of multi-state register stages and responsive to each of said input signals to shift a change in state per stage progressively through said stages, each of said stages being responsive to such change in state thereof to indicate such change in state at output means for that stage, weighting network means coupled to the output means of said stages to derive from the passage of each such change in state through said shift register means a Hilbert-transform signal segment and circuit means responsive to each such signal segment to integrate such segment.

14. A system as in claim 9 in which said sequence of spaced indicia is in the form of a stream of pulses representative of binary data and in which said system further comprises non-linear circuit means responsive to said output signal to reconstitue therefrom a stream of binary data pulses separated by time intervals corresponding to those between said first-named pulses.

15. A system for processing an electrical input signal characterized in the time domain by a first mathematical function having both real zeros and complex zeros said system comprising, first transformation means responsive to said input signal to provide amplitude emphasis with increasing frequency so as to convert said input signal to a form describable by a second mathematical function related to said first function such that at least some of the complex zeros of said first function are converted into real zeros, whereby the ratio of the number of real zeros to the number of real and complex zeros combined is greater in said second function than in said first function non-linear signal-transfer means responsive to the zero crossings of said transformed signal to derive therefrom a succession of pulses of which consecutive ones are separated by time intervals corresponding to those between such zero crossings, electrical means responsive to said succesion of pulses to effect Hilbert-transformation and integration of each of such pulses so as to form an output having a waveform comprised of a succession of integrated Hilbert-transformed signal segments, means to effect electrical exponentiation of said output, means operative in response to the successive zero crossings of said transformed signal to render of alternately opposite polarity the successive signal segments of said exponentiated output which are defined over the intervals between consecutive zeros of said exponentiated output to thereby provide an interpolation signal, and second transformation means responsive to said interpolation signal to effect thereon a transformation which is the inverse of that effected by said first transformation means so as to derive from said interpolation signal an output signal describable by a mathematical function characterized by real zeros and complex zeros corresponding in delayed time, respectively, to real zeros and complex zeros of said first mathematical function.

16. Apparatus for processing an input signal characterized by variations in instantaneous amplitude and zero crossings separated by finite intervals comprising, non-linear signal transfer means responsive to said input signal to derive therefrom a square wave signal having zero crossings separated by intervals corresponding to those of said input signal, pulse generator means responsive to said square wave signal to convert such signal into the form of a train of pulses, digital shift register means coupled to said pulse generator means to receive the output thereof, said shift register means being comprised of a plurality of stages providing respective outputs indicative of a presence of a pulse in that stage, means to shift each of said pulses in said train through said stages of said register means at a rate at least twice faster than the fastest rate of occurrence of said pulses, and circuit means responsive to the outputs produced by said stages in the course of the shifting therethrough of said last-named pulses to combine said outputs so as to form staircase waveforms therefrom.

17. A system for producing a continuous signal interpolating between locations separated by finite intervals in the domain of a parameter $t$, said system comprising, means for producing a succession of indications representative of said locations and separated by intervals commensurate with those between said locations, generating means responsive to said indications to produce an output represented by a waveform embodying the function:

$$\sum_i \log |t - \tau_i|$$

where $t$ is a variable and $\tau_i$ is representative of a succession of values separated in the $t$ domain by intervals commensurate with those between said indications, exponentiating means to effect exponentiation of said output, said exponentiated output being comprised of signal segments defined over respective intervals between consecutive zeros characterizing such outputs, and polarity-assigning means operative in response to said successive indications and operable on said exponentiated output to render said segments of alternately opposite polarity in a waveform providing said continuous signal.

18. A signalling system comprising, means for converting an information-bearing input signal to a series of spaced pulses each representing the occurrence of an information-bearing characteristic of said signal, circuit means responsive to said pulses to produce a continuous electrical signal interpolating between said pulses, said continuous signal being limited in frequency band and having zero crossings spaced in accordance with said pulses, and further circuit means responsive to said band-limited continuous signal for deriving from the zero crossings thereof the information content of said input signal.

19. The method of processing a succession of electrical pulses of which consecutive ones are separated by time intervals comprising, deriving by interpolation between said pulses a continuous bandlimited electrical signal having alternating polarity segments with zero crossings separated by time intervals corresponding to those between said pulses except for displacements caused, if at all, by an additive constant signal component, and subjecting said continuous bandlimited signal to a non-linear transforming action to reconstitute therefrom a succession of pulses separated by time intervals corresponding to those between said first-named pulses except for zero displacements caused, if at all, by an additive constant signal component.

20. The method of processing an electrical input signal characterized in the time domain by a first mathematical function having both real zeros and complex zeros comprising, subjecting said input signal to a first transforming action providing amplitude emphasis with increasing frequency so as to convert said input signal to a form describable by a second mathematical function related to said first function such that at least some of said complex zeros of said first function are converted into real zeros, whereby the ratio of the number of real zeros to the number of real and complex zeros combined is greater in said second function than in said first function, deriving by interpolation between the time instants of the zero crossings of said transformed signal a continuous bandlimited signal substantially preserving in a delayed manner said last-named zero crossings, and subjecting said bandlimited signal to a transforming action the inverse of said first transforming action so as to derive from said bandlimited signal an output signal characterized in delayed time by a mathematical function having real zeros and complex zeros corresponding, respectively, to real zeros and complex zeros of said first mathematical function.

21. The method as in claim 20 in which said deriving step is effected by producing in response to the zero crossings of said transformed signal a succession of pulses separated by time intervals corresponding to those between said zero crossings, deriving from said succession of pulses an output having a waveform representing a succession of integrated Hilbert-transform signal segments, producing from said signal segments an output whose waveform is the exponential of said succession of signal components, and controlling the polarity of the successive signal segments of said last-named output between consecutive zeros thereof to render said last-named segments of alternately opposite polarity and to thereby provide said continuous bandlimited signal.

22. A method for deriving a continuous output signal that interpolates between indicia separated by finite intervals comprising the steps of, generating a succession of input signals representative of said indicia and separated by intervals corresponding to those between said indicia, deriving from said succession of input signals an output having a waveform representing a succession of integrated Hilbert-transformed signal segments, producing from said signal segments an output whose waveform is the exponential of said succession of signal segments, and controlling the polarity of the successive signal segments of said last-named output between consecutive zeros thereof to render said last named signal segments of alternately opposite polarity, thereby to provide said continuous output signal.

23. A method as in claim 22 further comprising the step of deriving from said output signal, by non-linear transformation thereof, a succession of pulse signals separated by intervals corresponding to those between said indicia.

24. A method as in claim 22 wherein said generating step is effected by subjecting a starting signal having zero crossings separated by finite intervals to a non-linear transforming action so as to accentuate the zero crossings thereof, and converting the accentuated zero crossings of said starting signal into said succession of input pulses.

25. A method of signalling at reduced frequency bandwidth comprising the steps of, converting an information-bearing electrical input signal to a series of spaced pulses each representing the occurrence of an information-bearing characteristic of said signal, deriving by interpolation between said pulses a continuous bandlimited signal having zero crossings spaced in accordance with the spacing between said pulses, transmitting said bandlimited signal to a receiving location, and at said receiving location, reconstituting from the zero crossings of said received bandlimited signal the information content of said input signal.

References Cited

UNITED STATES PATENTS

| | | | |
|---|---|---|---|
| 3,124,745 | 3/1964 | Schroeder | 235—181 |
| 3,187,273 | 6/1965 | Chasek | 332—1 |
| 3,278,685 | 11/1966 | Harper | 324—77 |
| 3,303,335 | 2/1967 | Pryor | 235—181 |

OTHER REFERENCES

Glorioso et al.: IEEE, March 1965, vol. Com–13 (Transactions on Com. Tech.), pp. 109–116, Experiments in "SSB-FM" Communication Systems.

MALCOLM A. MORRISON, Primary Examiner

F. D. GRUBER, Assistant Examiner

U.S. Cl. X.R.

235—181; 325—26, 38; 329—107; 332—1, 9; 324—77; 179—15.55